US005078257A

United States Patent [19]

Carter, Jr.

[11] Patent Number: 5,078,257

[45] Date of Patent: Jan. 7, 1992

[54] LATTICE PRODUCTION LINE AND METHOD OF OPERATING SUCH A LINE

[75] Inventor: Donald W. Carter, Jr., 32B Winthrop Ct., Wappingers Falls, N.Y. 12590

[73] Assignee: Donald W. Carter, Jr., Wappingers Falls, N.Y.

[21] Appl. No.: 440,047

[22] Filed: Nov. 21, 1989

[51] Int. Cl.[5] ........ B65G 37/00

[52] U.S. Cl. ........ 198/369

[58] Field of Search ........ 198/365, 366, 369, 370, 198/372, 456, 346.2, 601, 861.6; 29/563

[56] References Cited

U.S. PATENT DOCUMENTS 3,530,571 9/1970 Perry ........ 29/563
4,291,797 9/1981 Ewertowski ........ 198/365 X
4,515,264 5/1985 Sticht ........ 198/465.2

*Primary Examiner*—Joseph E. Valenza
*Assistant Examiner*—Keith Dixon

[57] ABSTRACT

A lattice production line includes a plurality of work stations, each connected to adjacent work stations by more than two conveyor belts. Each work station includes a manufacturing robot, an outer turntable with workpiece storage, and an inner turntable aligned with the robot. A program is provided to operate each conveyor, turntable, and robot independently, wherein parallel processing of workpieces through the system is possible. A preproduction scheduling algorithm provides for initial efficient use of the lattice, while a run-time algorithm enables the lattice to respond efficiently to the occurrence of faults.

5 Claims, 4 Drawing Sheets

LATTICE PRODUCTION LINE AND METHOD OF OPERATING SUCH A LINE

BACKGROUND OF THE INVENTION

The instant invention relates to a lattice production line and method of operating such a line.

Effectively operating an automated assembly line requires the solution of a number of problems. First, it is desirable to achieve maximum throughput efficiency. Second, the production line should have the ability to efficiently recover from a breakdown or failure of one or more of the elements of which the line is comprised so as to recover as soon as possible after a work station breakdown or task disruption. Third, it is desirable to maximize concurrency. Solutions to these three problems enables one to utilize as many robot assemblers simultaneously as possible in order to maximize throughput efficiency which, in itself, introduces the additional problem of preventing and recovering from deadlocks, wherein the production line, in essence, becomes jammed.

As a general approach to solving these problems, the patent literature includes a number of references wherein conveyor belts convey workpieces to and from turntables in order to direct workpieces through a manufacturing operation. In U.S. Pat. No. 3,530,571, workpieces on pallets are directed through a number of work stations while being queued on selected conveyor belts. However, the system in this patent is not suitable for the parallel processing of workpieces, wherein manufacturing operations are performed at turntable locations. Other patents, such as U.S. Pat. No. 4,480,738, disclose workpiece storage and shuttle apparatus; however, they do not disclose turntable arrangements. U.S. Pat. No. 4,515,264 discloses an array of four turntables connected to one another by orthogonal pairs of parallel conveyors. However, the turntables do not have storage facilities which are indexable and do not include independently indexable central areas. U.S. Pat. No. 4,291,797 discloses a pallet changer for a manufacturing plant, wherein a turntable selectively aligns with a number of conveyors. However, this alignment is for purposes of distribution among conveyors, rather than facilitating manufacturing steps performed at the conveyors so as to provide a lattice manufacturing system. Other patents of similar significance are U.S. Pat. Nos. 4,326,624 and 4,014,428, which also disclose turntables in combination with aligned conveyor belts. Lattice systems such as that proposed in the article by Cai et al., "Petri-Nets for Robot Lattices," *Proceedings of the* 1987 *I.E.E.E. International Conference on Robotics and Automation.* March–April 1987, Vol. 2, pp. 999–1004, suggests an arrangement for achieving maximum interconnectivity. But to yield maximum flexibility for the rerouting of tasks upon the occurrence of a station failure requires that each station have additional degrees of flexibility not provided by the prior art. In view of these and other considerations, there is a need for production lines which can take full advantage of assembly robots and other manufacturing robots, wherein a lattice is provided allowing for maximum throughput of workpieces with allowance for work station failure that does not shut down or hobble the entire assembly line.

SUMMARY OF THE INVENTION

In view of the aforementioned considerations, the instant invention contemplates a production line which includes a plurality of work stations for processing a plurality of workpieces, wherein first and second turntables are provided at nodes of a lattice-type conveyor structure. The first and second turntables are preferably concentric with one another, with the second turntable being disposed within the first turntable and having means thereon for shifting workpieces radially so as to align selectively with radial storage sites on the first turntable. The first and second turntables are rotatable independently of one another in accordance with programmed instructions so as to align with selected conveyors of the conveyor lattice. At each work station there is positioned a device for performing a manufacturing operation on workpieces at that station. For example, such a device might include an assembly robot which assembles two different workpieces 15. Operation of the lattice is, in effect, supervised by a computer program which selects one of a plurality of work stations to which a workpiece is transferred according to the availability of that work station for performing additional manufacturing or assembling operations with respect to that workpiece.

In accordance with further aspects of the instant invention, the lattice is configured with at least three conveyor belts aligned with each node or work station, wherein the program for selecting the work station to which a workpiece is transferred makes the selection so that a plurality of workpieces flows through the production line in a parallel array.

In accordance with the process of the instant invention, each element of the production line operates independently of every other element, with each node of the lattice operating simultaneously while objects move between the nodes, wherein massive parallel processing of the workpieces takes place in accordance with optimum paths for the flow of workpieces into and through the lattice.

BRIEF DESCRIPTION OF THE DRAWINGS

Various other objects, features, and attendant advantages of the present invention will become more fully appreciated as the same becomes better understood when considered in conjunction with the accompanying drawings in which like reference characters designate the same or similar parts throughout the several views, and wherein.

DETAILED DESCRIPTION

Figure 1:
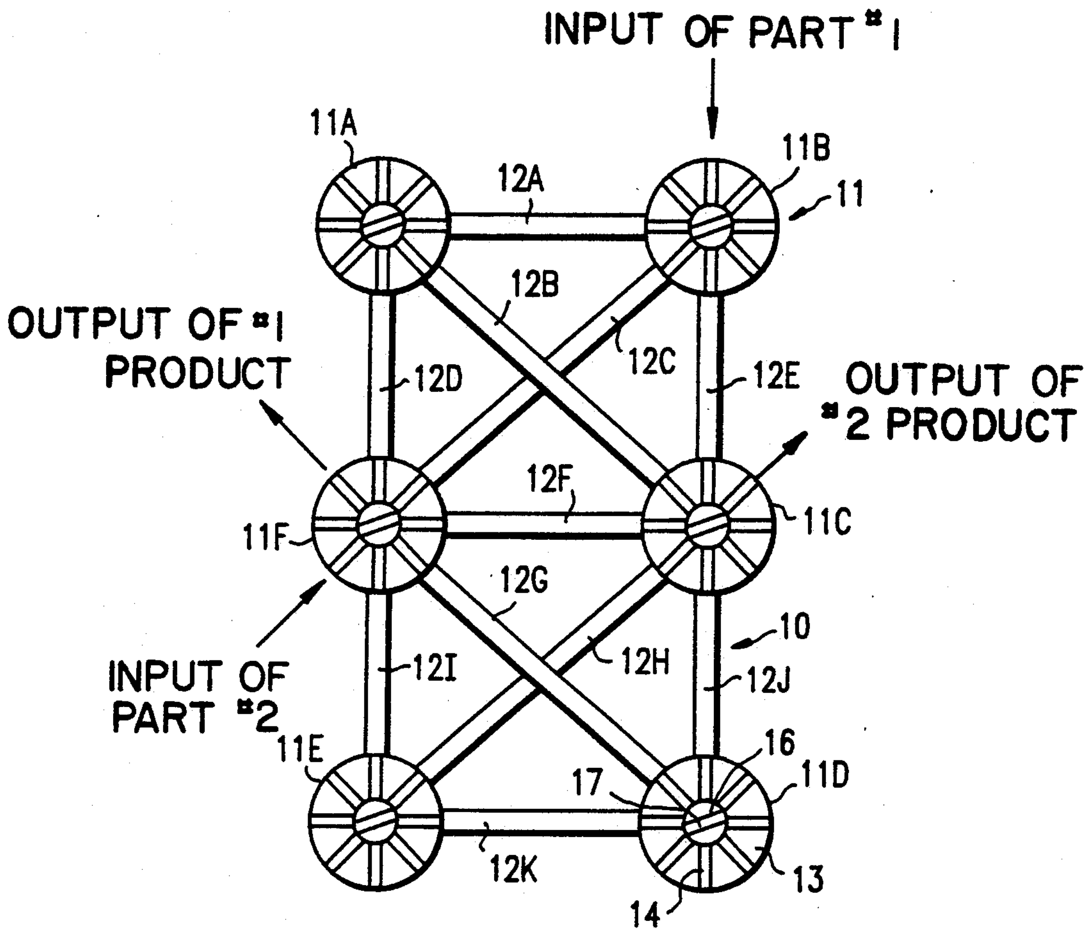
FIG. 1 is a top planar view of a lattice production line configured in accordance with the principles of the instant invention.

Referring now to FIG. 1, there is shown a lattice production line, designated generally with the number 10, configured in accordance with the principles of the instant invention. The lattice production line 10 comprises a plurality of work stations 11A–11D connected by an array of interstation conveyor belts 12A–12K. Each of the work stations 11A–11D comprises a turntable 13 having a multiplicity of radial slots 14 disposed therein for storing workpieces. In the illustrated embodiment, each turntable has eight storage slots 14; however, the number of storage slots is not critical to the invention, but it is preferable that the number of storage slots exceeds the number of conveyor belts juxtaposed to each work station 11. The turntable 13 has a central area in which is disposed a second turntable 16 which has thereon a conveyor belt 17, which is radially disposed to align selectively with the radial storage slots 14 in the first turntable 13. The workpieces 15 are advanced in the slots 14 by conventional means, such as conveyor belts 18 or perhaps gravity or springs, to the belt 17 for positioning so that the robot 20 can perform its operations. Disposed vertically in spaced relation to each of the work stations 11A–11D is a manufacturing robot 20 which performs some type of work on the workpieces 15. The robot 20 can perform an assembly function or perhaps treat the workpiece in some way, such as applying paint to the workpiece or perhaps adhesive or any other function.

Figure 2:
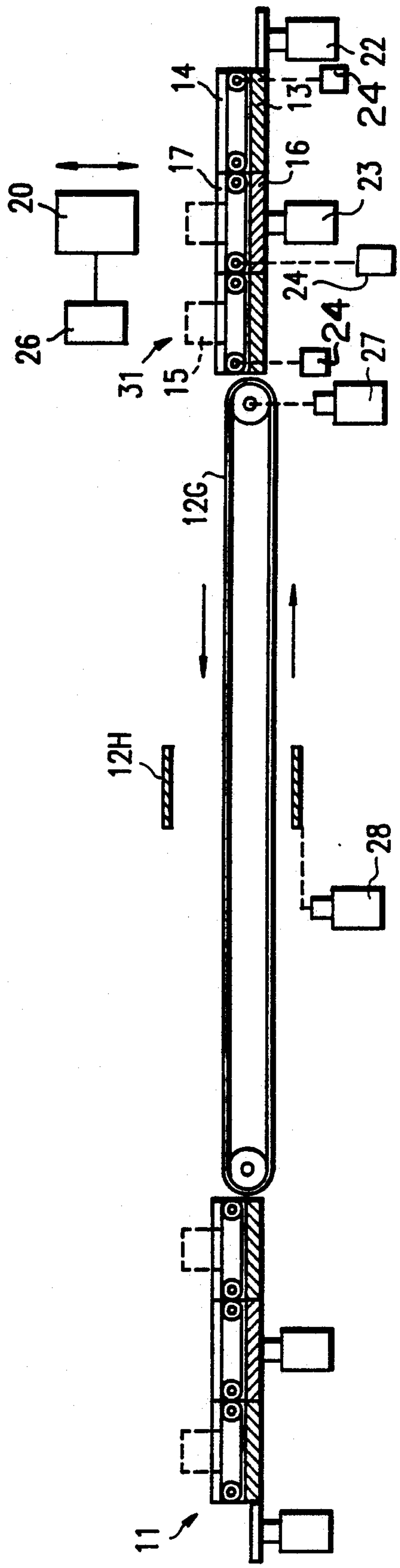
FIG. 2 is a cross-section of a portion of FIG. 1.

As is seen in FIG. 2, the first turntable at each station 11 is rotated by a motor 22, and the second turntable is rotated by a motor 23. Belt 17 is driven by a motor 24, and the robot 20 is energized by operation of motor means 26, which can, of course, include the entire mechanical configuration necessary for operation of the robot. The conveyor belts 12A–12K are each driven by separate motors illustrated by motors 27 and 28. Each of the motors 22–28 operates independently of one another. In that belts such as 12H and LAG intersect one another, it is necessary to pass one belt through the other so that belt 12H is raised and bridges belt 12G so as to avoid interference between the belts.

Figure 3:
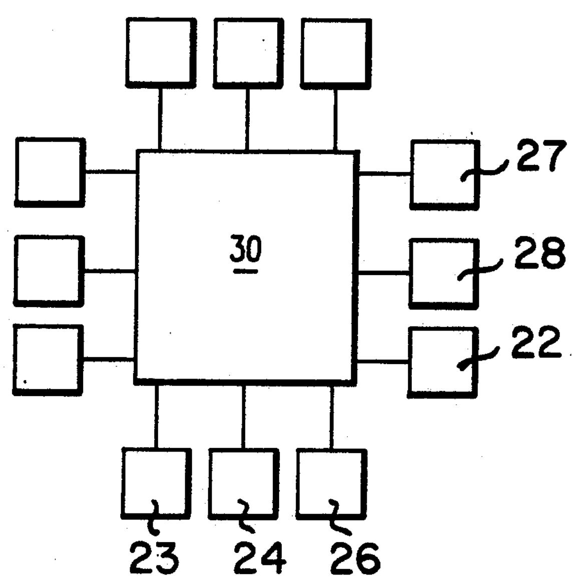
FIG. 3 is a schematic view showing a plurality of work station nodes arranged in a lattice in accordance with the principles of the instant invention so as to facilitate parallel production line processing of workpieces to be assembled or otherwise treated or processed in accordance with the instant invention.

As is seen in FIG. 3, each motor is connected to a central processor 30, which is a computer that selects the motor to be energized. In addition to the motors operated by the central processor 30, there are sensors 31, such as optical sensors or the like, which determine whether the storage slots 14 have workpieces 15 therein or are empty and also the number of workpieces in each slot.

Figure 5:
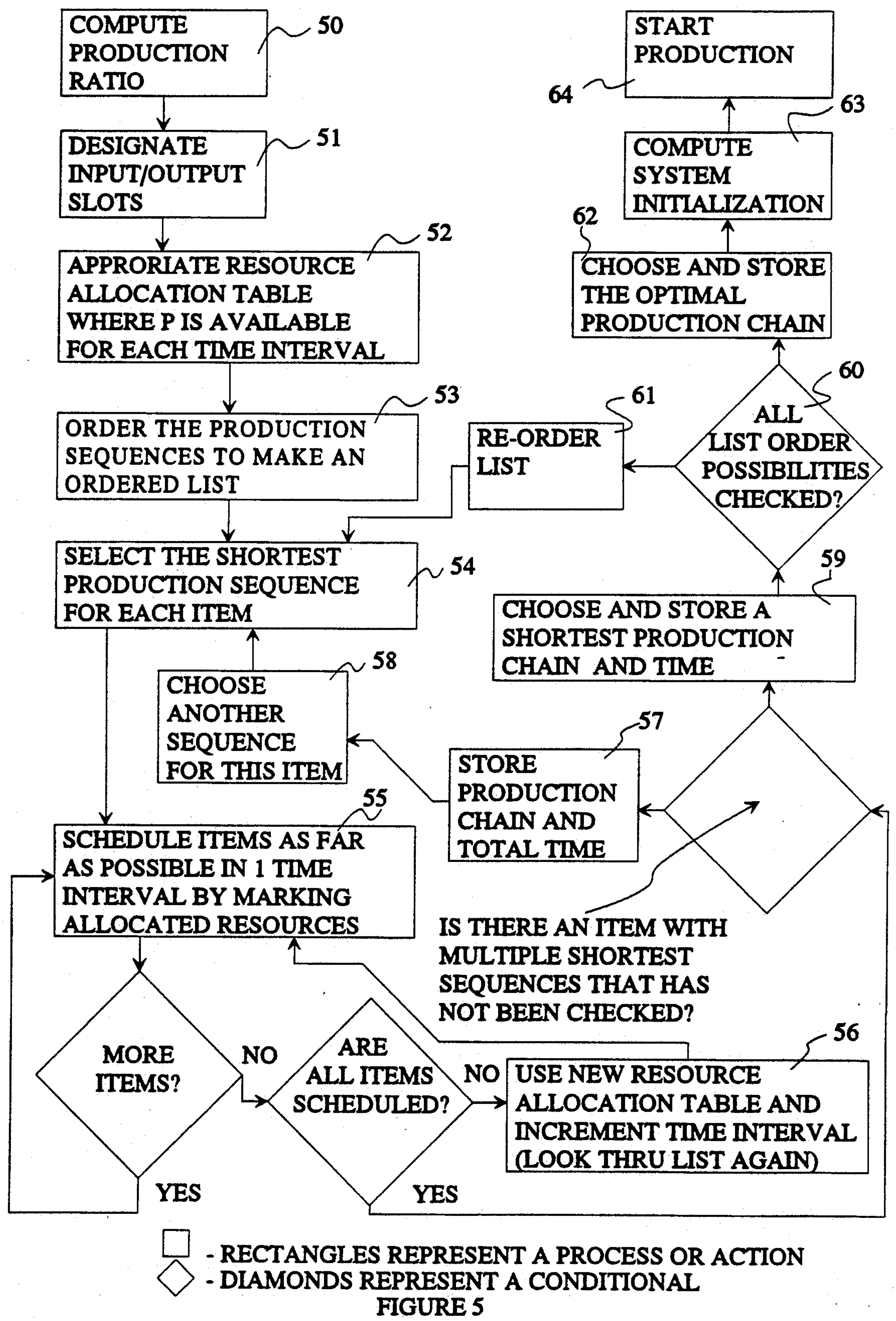
FIG. 5 is a flowchart illustrating a preproduction scheduling algorithm in accordance with the instant invention.
Figure 6:
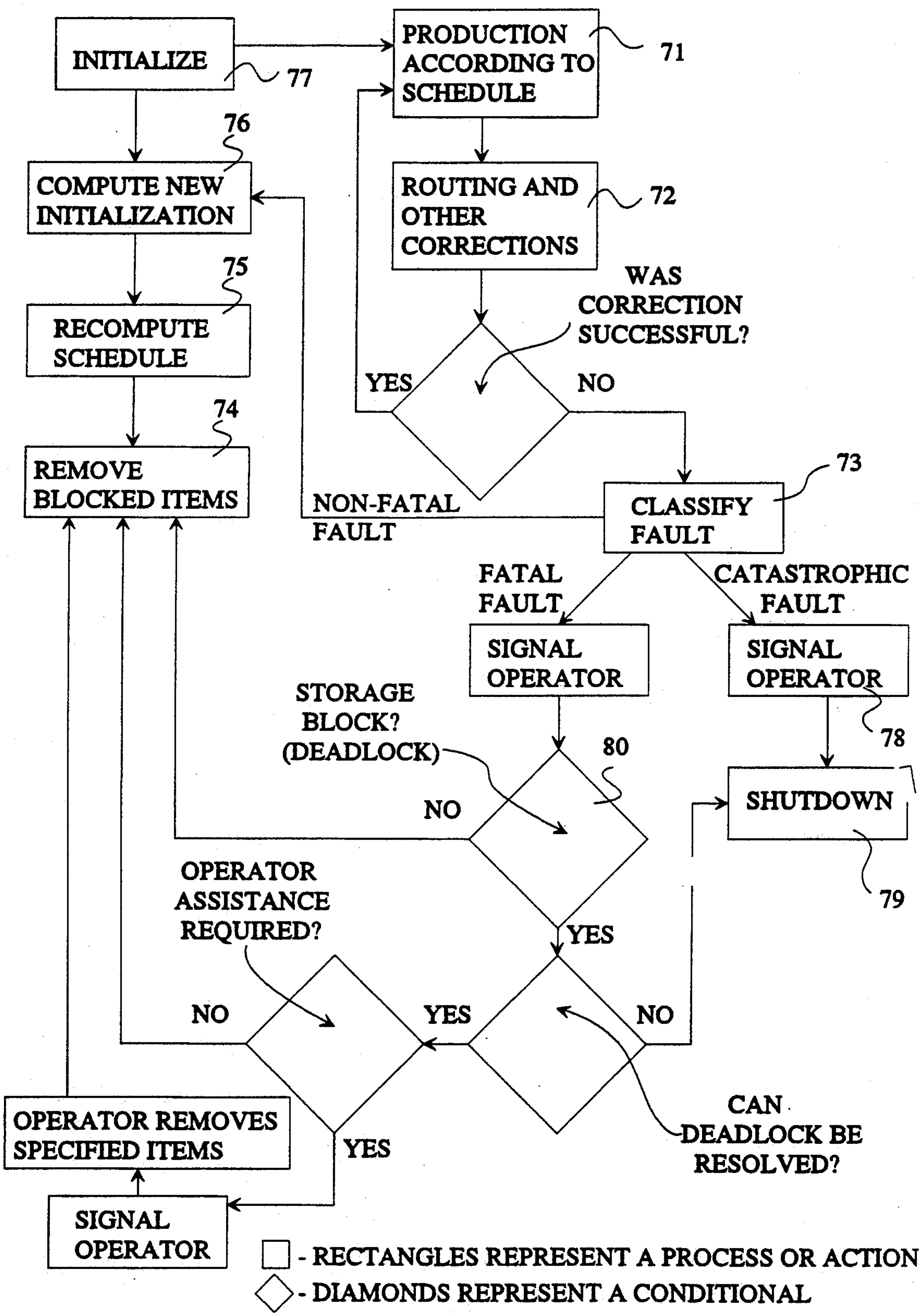
FIG. 6 is a flowchart illustrating a run-time algorithm in accordance with the instant invention.

Referring now to FIG. 3, the central processing unit or computer 30 is shown, which independently controls the motors 20–28 in accordance with a computer program designed to effectuate the flowcharts of FIGS. 5 and 6. Computer 30 also receives input from the sensors 31 which, in effect, take an inventory of workpieces 15 stored in slots 14 of the first turntables 13. Utilizing this information, the computer 30 is able to instruct the motors 22–28 throughout the system to effect a parallel flow of workpieces 15 through the production line. As is seen in FIG. 3, a parallel flow of workpieces is possible because the lattice includes a plurality of connections via conveyor belts 12 to each work station 11. Consequently, if a work station 11 is occupied by performing a manufacturing task or has the storage slots 14 filled, another work station is selected so that there is no logjam at the input. Accordingly, the capacity of the production line to take full advantage of robotic assembly is enhanced.

One difficulty is using manufacturing robots is that they are subject to failure if the production line is arranged in series and the failure of one robot in the series can shut down the entire production line. With parallel production using a lattice configuration production is facilitated because the system has three main components, i.e., the work stations or nodes 11, interstation belts 12, which serve as links between the slots, and station slots 14. The belts or links 12 and the slots 14 all use bidirectional belts. One major theme behind the lattice concept is that every station 11 is linked to all adjacent stations by the belts 12. In conceptualizing the invention, the stations 11 are in essence still points or nodes within the lattice, wherein workpieces 15 move horizontally at relatively rapid rates while being conveyed by the belts 12 and pause for manufacturing operations at the nodes.

While the nodes (work stations) 11 are stationary with respect to the conveyors 12, each node is dynamic in and of itself in that the first or outer turntables 11 have two degrees of rotational freedom, and the inner turntables 16 have two degrees of rotational freedom, while the robots 20 have two degrees of linear freedom in a direction perpendicular to the turntables. The slots 14 at the stations store or accumulate workpieces 15 so as to retard the flow of individual workpieces through the system without adversely effecting the flow of workpieces, since each workpiece has a number of options as to which station it will subsequently occupy. As is seen in FIG. 1, there are internal slot decisions, wherein the slots align with conveyor belts 12, and external slot positions, wherein the slots allow input and output through the lattice 10. Since each station 11 includes an inner turntable 16 with a translating conveyor belt 17 therein, ready access to any selected external slot 14 is available. Accordingly, a finished workpiece 15 may be ejected from the lattice through one of the external slots 14 or, if in need of further processing, may be transmitted to a conveyor belt 12 and a subsequent processing station along an aligned conveyor belt 12. Likewise, in any station 11, workpieces 15 to be processed by the lattice may enter the system, as long as the particular station has external slots. Of course, the system will be set up beforehand so as to have some rational orientation, wherein there is a circumferential designation for the input and output of the workpieces 15 at each external node 11.

Effective utilization of the lattice structure 10 requires a scheduling of tasks. In accordance with the instant invention, two separate algorithms are relied upon, one being a reproduction scheduling algorithm and the other being a run-time algorithm. The prescheduling algorithm is set forth in FIG. 5, while the run-time algorithm is set forth in FIG. 6. In essence, the preproduction scheduling algorithm produces optimum scheduling of tasks before production begins, whereas the run-time algorithm is utilized during the production process to address any faults that occur during production.

Referring first to the preproduction or scheduling algorithm, the scheduling algorithm utilizes fixed, discrete time intervals or states. These discrete time intervals are used to periodically synchronize the system, wherein the system is synchronized at the boundaries of the discrete intervals. Every manufacturing process or task must start or end in the same time interval. Between each time interval, there is a node pause so as to allow all workpieces 15 that have not moved to their next node time interval to do so.

In contrasting this arrangement to the prior art approaches, a completely unsynchronized manufacturing scheduling algorithm allows tasks to start and end at any time. This results in a more complex, more computation-intensive algorithm which is analog in nature and requires the computation of many more production strategies to arrive at an optimum production strategy.

Once the scheduling algorithm of FIG. 5 is effected, the run-time algorithm of FIG. 6 is not difficult to effectuate.

In considering the scheduling algorithm in detail, the following definition of terms is relied on:

$R=\{R_1, R_2, \ldots R_l\}$ is the set of all nodes or processing stations; R contains 1 element for each node;

$T=\{T_1, T_2 \ldots T_m\}$ is the set of all tasks that can be performed by all of the machines; for all x, y elements of T, $x<>y=>task_x<>task_y$; let $T_{1x}$ represent $T_1$ at node x $t=\{t_1, t_2 \ldots t_\phi\}$ is the set of times to accomplish tasks such that $t_z<=1$ where $1<=z<=\phi$ and for all $t_z$, only one $t_z$ such that $t_z=1$; each $t_x$ is called a task relative time weight; there is a one to one correspondence between t and T i.e. $t_x$ is time is takes to perform task $T_x$; let $t_{1x}$ represent the time for $T_1$ at node x $t'=\{t'_1, t'_2 \ldots t'_o\}$ is th eset of adjusted relative task times such that $t'_x=t_x{}^*$ duration of the time interval $l=\{_1, l_2, \ldots l_n\}$ is the set of all items to be produced. Items are finished products; for all x, y elements of I, $x<>y=I_x<>I_y$ $K=\{0, 1, \ldots k\}$ is the number of time interval boundaries in the production chain; all time intervals have the same duration; the duration must be equal to or greater than the time for the task where $t_x=1$ $S^a$=a set of finite sequences of tasks that will produce $I_a$;

where $1<=a<=n$; for all x, y elements of l, $x<>y=>S_x<>S^y=>I_x<>I_y$ $S^{aj}$ =a particular production sequence of tasks that will produce $I_a$; $J=\{1, 2, \ldots q\}$, J is the number of ways to produce $I_a$, j is a specific method of production;

$$\sum_{j=1}^{b} S^{aj}$$

will produce $I_a$ so, each $S^{aj}$ has b steps;

P=the set of all possible tasks that can be done by the system, i.e. $P=\{P^1, P^2, \ldots P^l\}$ $P^c$=the set of tasks that can be performed by a robot a node $R_c$; for all x, y elements of I, $x<>y=>P^x<>P^y$ E=a production chain—a time line with k intervals s.t. $0<=k<=$some finite number, where production sequences, $S^a$ are mapped between internal boundaries in a manner s.t. for all elements of I, at least on of $I_x$ is produced where $i<=x<=n$ using nodes in R that can perform only the tasks in P.

Figure 4:
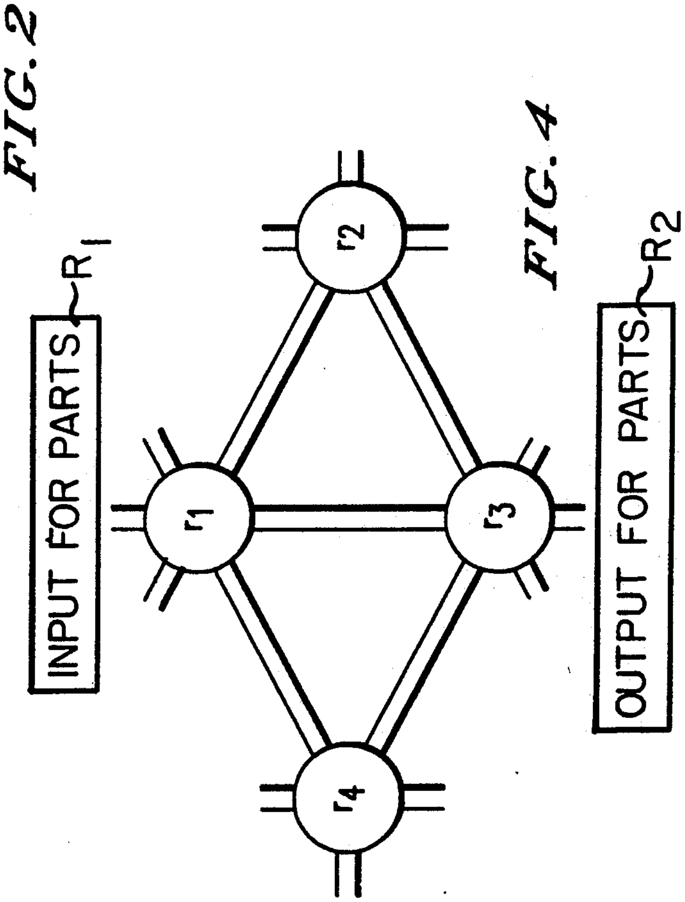
FIG. 4 is a diagramatic portion of the lattice structure.

$E_k$=the kth time interval in the processing chain; for all x, y elements of I, $x<>y=>E_x<>E_y$ An understanding of the preproduction or scheduling algorithm set forth in FIG. 5 is gleaned from reference to FIG. 4, wherein nodes 11 are shown connected by conveyor belts 12 with an input station 41 and an output station 42. Considering that all links or belts can transport a single workpiece 15 in both directions and assuming that the transport time between any two adjacent nodes or stations 11 is the same and that adjacent nodes are any two nodes that are separated by one link, the transfer time between adjacent nodes is set equal to one-tenth of a time interval; and the rotational latency of the outer turntables 13 and the inner turntables 16, as well as the time required to transfer an object between a station slot 14 and the belt 17 or between the station slot 14 and the conveyor belt 12, is negligible.

In designing the scheduling analog for a particular production, the robots 20 on each node are selected, and the tasks are defined with general industrial engineering concepts. These concepts are then integrated into the flowchart of FIG. 5, which sets forth the general steps of the algorithm.

If, for example, the lattice is utilized to make furniture, such as desks, chairs, and bookshelves, it is seen from FIG. 4, that there are four nodes, i.e., $L=4$. The next step is to define the capabilities of each node by setting forth the tasks which can performed by each robot. In accordance with the example at hand, the following notations are utilized:

$P=\{P^1, P^2, P^3, P^4\}$ $P^1=\{T_1, T_2\}$, $P^2=\{T_3\}$, $P^4=\{T_1\}$.

Each task is assigned a relative time weight, which is relative to the longest task to indicate what percentage of a time interval is required at each node to accomplish the task. For example, let $P^1=[t_1=0.3, t_2=0.7]$. The process does not occur across interval boundaries; therefore, the time for all of the tasks that occur at any node in a sequential manner without rest must be less than or equal to one time interval. The converse is also true, wherein the time interval must be greater than or equal to the time it takes to perform the longest tasks at any node. Within a given time interval, $P^1$, it is required that P1 can perform the following tasks:

(a) perform $t_1$, 1, 2, or 3 times because $0.3\times0.3<1$; or (b) perform both $t_1$ and $t_2$ because $0.3+0.7=1$; or (c) perform $t_2$ once because $0.7<1$ in keeping with our example, let $P^2=\{(t_3=0.2\}$, $P^3=\{(t_2=0.5\}$, $P^4=\{t_1=1\}$.

It has now been decided what tasks can be decided at each node or work station and how much relative time each individual task takes. The scheduling algorithm can now be applied.

Utilizing the period, synchronous state switching implemented by the flowchart of FIG. 5, it is seen that the first block of 50 in the algorithm computes production ratios for maximum profit, which ratios are entered into the system. In the instant example, it is determined that maximum profit is achieved by producing two chairs, one desk, and a bookshelf, which are represented as follows:

$l_1$=chairs, $l_2$=desks, $\mathbf{1_3}$=bookshelves, and let their respective sequences be $S^1$ for chairs, $S^2$ for desks, and $S^3$ for bookshelves; so, the production ratio is $S^1(2) : S^2(l) : S^3(l)$. This means that $S^1$ will appear twice in the production chain, while $S^2$ and $S^3$ will only appear once.

The second box 51 in the flowchart of FIG. 5 designates use of the input/output slots 14 of FIG. 1. Utilization of the input and output slots 14 is quite flexible because workpieces 15 can be introduced at any external slot, and finished products can be removed from an external slot. Accordingly, it is possible to have nodes at shipping bays and to use the slots 14 at the bays to transfer goods directly from the manufacturing line to a dock for loading. This, of course, reduces the need for storage and the numerous problems which arise in controlling inventory. In the illustrated example, all inputs occur at $R_1$, and all outputs occur at $R_2$ (see FIG. 4).

For ease of calculation, it is assumed that input and output occur instantaneously, the time for this operation being accommodated in other time intervals.

The third box 52 assesses the total resources available and provides a resource allocation table. All resources are free to be used between the time interval boundaries; therefore, the total resources of the system, P, are available for allocation during each time interval. For example, if the time for each interval is equal to the time it takes to complete the longest task, $t_1$ at node 4, then $t'_x = t_x$ because the task relative wait time interval equals x * 1, which equals x. However, if the time interval was 1.5 (relative to $P^4$), instead of 1, then $P_4 = [t'_1 = 1.5]$. The step which occurs at box 52 also takes into account the storage capability of the station slots 14 at each node 11. For example, suppose there is a saw at a lumber mill that is capable of cutting a block of wood in half every 5 seconds. Suppose the next step for the item that is currently being worked on is sanding, which is a step that takes 3 minutes. In an ordinary system, the block that was cut in half must wait until the sander is finished. If this wait occurs at the saw, then the throughput of the saw is greatly reduced. The common solution is to add more saws which, of course, increases the cost of manufacturing. Utilizing the instant invention, this alternative would be avoided because in a lattice system with station slots 14, the two half-blocks can be sent to the sander to wait at its station slots, or they can wait at the station slots of the saw. This option frees the saw to process more of the same item. If the station slots 14 at the sander become full, then other items can be processed having a designation or next step which is not a sanding step. Accordingly, the sander can continue to process parts until all of the available station slots are filled.

The fourth block 53 is directed to ordering the workpieces to make an ordered list. For example, if the list is designated by $L_1, L_2, L_3$, there are instances where it is necessary to prioritize items on the list. The primary reason for prioritizing the workpieces is that the order in which the items are produced affects the length of the production chain so that workpieces 15 that are processed within timeframes smaller than the scope of the production chain need to be placed in the most optimal order. Accordingly, all permissible permutations of the list entered into box 53 should be computed to produce the optimal production chain. In the example used in this application, the items are not prioritized; and, therefore, any order will do because the algorithm will compute all possible workpiece orders.

The fifth box 54 requires selection of the shortest production sequence for each workpiece. This requires that the production sequences of each item be defined, which is expressed by the following production sequences:

$S^{11} = \{T_1, T_2, T_3\}$, $S^{12} = \{T_2, T_1, T_3\}$,
$S^{21} = \{T_1, T_3, T_1\}$
$S^{31} = \{T_1, T_1, T_3\}$.

Notice that $l_1$ has two shortest sequences.

In the sixth box 55, the work on each workpiece 15 is scheduled as far as possible within one time interval. This is simulated by marking the resources as they are used. In box 56, after all of the workpieces have been processed, the time interval is incremented, and a new unmarked resource allocation is used until the requested items are produced. In other words, a production chain, E, is being computed.

Before scheduling of items can begin, it is necessary to compute priority chains based on the distance between each node, i.e., the length of the conveyor belts 12. Consequently, distance penalties are taken into account when allocating node resources. For priority zero nodes, there are no penalties. However, for nodes with a higher priority, the following penalties are assessed:

penalty = priority #* (transfer time between two adjacent nodes = 0.1) and total task cost = task cost + penalty.

Naturally, the node that offers the total task cost is always chosen. Considering the specific example, wherein commas are used to distinguish separate nodes of the same priority and semi-colons are used to distinguish priority levels:

$R_1 = R_2, R_3, R_4$—all nodes have the same priority, priority 0

$R_2 = R_4, R_2; R_1$—in this case, $R_1$ and $R_3$ have priority 0, and $R_2$ has priority 1

$R_3 = R_4, R_2, R_1$—all nodes have the same priority, priority 0

$R_4 = R_3, R_1, R_2$—in this case, $R_1$ and $R_3$ have priority 0, and $R_2$ has priority 1.

Generally, a workpiece at node $R_4$ would attempt to find the next process for the workpiece at $R_1$ or $R_3$ before trying $R_2$. Accordingly, E can be computed using the methodology of Tables 1 and 2.

TABLE 1

| item sequence | tasks performed during time interval | nodes where tasks are active | link utilization intervals (end times) |
|---|---|---|---|
| | | Time interval #1 | |
| $S^{11}$ | : $T_1, T_2$ | $R_1, R_3$; | $link_{1,3}$ (.4), $link_{3,2}$ (1) |
| $S^{11}$ | : $T_1$ | $R_1$; | $link_{1,3}$ (.7) |
| $S^{21}$ | : $T_1$ | $R_1$; | $link_{1,2}$ (.1) |
| $S^{31}$ | : $T_1$ | $R_4$; | no links used |
| between time interval #1 and time interval #2 $link_{4,1}$ is used to transfer the object at $R_4$ to $R_1$. | | | |
| | | Time interval #2 | |
| $S^{11}$ | : $T_3$ | $R_2$; | $link_{2,3}$ (.3) |
| $S^{11}$ | : $T_2, T_3$ | $R_3, R_2$; | $link_{3,2}$ (.6), $link_{2,3}$ (.9) |
| $S^{21}$ | : $T_3, T_1$ | $R_2, R_1$; | $link_{2,1}$ (.5), $link_{1,3}$ (.9) |
| $S^{31}$ | : $T_1, T_3$ | $R_1, R_2$; | $link_{1,2}$ (.4), $link_{2,3}$ (1) |

between time interval #1 and time interval #2 $link_{4,l}$ is used to transfer the object at $R_4$ to $R_1$.

TABLE 2

Resulting E

| | 0 | 1 | 2 . . . k |
|---|---|---|---|
| $S^{1}1$: | $T_1, T_2$ | $T_3$ | |
| $S^{1}1$: | $T_1$ | $T_2, T_3$ | |
| $S^{2}1$: | $T_1$ | $T_3, T_1$ | |
| $S^{3}1$: | $T_1$ | $T_1$, $T_3$ | |

The lattice production line 10 utilizing the preproduction flowchart of FIG. 5 is able to complete a single production chain in only two time intervals. The use of concurrency in the algorithm allows twelve tasks to be completed using four robots and two time intervals, wherein the time interval is equal to the time it takes to complete the longest task.

The scheduling technique and storage capabilities prevent the possibility of deadlock in properly scheduled production chains. This is accomplished by elimination of the hold and wait condition that is necessary for a deadlock to occur.

Continuing further with the explanation of the flowchart of FIG. 5, if there is a production chain with multiple shortest sequences, such as $S^1$, that has not been checked, then boxes 57 and 58 are utilized, where the production chain and its total time is stored for later comparison. And $S^{1j}$ that has not been used for this ordered list is substituted for one of the $S^{1x's}$ currently in the list. If $S^{12}$, then the following ordered lists results: $\{S^{12}, S^{11}, S^{21}, S^{31}\}$.

If this is the case, then the steps of blocks 55 and 56 are utilized. Subsequently, there is an additional check to see if there is another substitution which can be made.

After all of the possibilities for the ordered list of items has been computed, then the flowchart goes to box 59, where the shortest production chain is stored.

Subsequently, one checks to see if all order possibilities have been considered. If not, the task of box 61 is performed, where the list is reordered, and another shortest production chain is computed. The process is repeated until all possible production chains have been computed, at which time the step of box 62 is performed, wherein the optimal production chain is chosen and stored. In box 63, system initialization is computed, wherein at time interval 1, the workpieces are required at two nodes $P^1$ and $P^4$. Earlier in the program, it was established that all input occurs at $R^1$. Since $R^4$ is further away, it is necessary to input the workpiece that is needed at $R_1$ first. Finally, the last box, box 64, starts operation of the production line, wherein the workpieces 15 begin flowing through the system in a parallel processing mode.

Referring now to FIG. 6, where the run-time algorithm is charted, we see that the program E continues to be executed until the desired number of workpieces are processed or until a fault occurs. When a fault occurs, the system attempts to effect a temporary rerouting of workpieces and initiates steps or corrections to alleviate the fault, as it set forth in box 72. If the repairs or corrections are successful, then the program E is recomputed to take into consideration any resulting deviations from the original resource allocation table.

After it is determined that the repair is unsuccessful, the next step is to classify the fault. In the run-time algorithm of FIG. 6, there are three categories of faults: a nonfatal fault, i.e., a fault that is not serious enough to prevent the production of an item in the system which is currently being worked on or an item that has been requested; a fatal fault, which is any fault which prevents the production of an item; and a catastrophic fault, a fault or set of faults that prevents the production of all items.

If the repairs are not successful and a nonfatal fault exists, then one goes to box 74, wherein the program E is recomputed. The next task set forth in box 75 is to finish all current items or workpieces within the system so as to empty the system. A new initialization set-up is accomplished at box 76 for a new program E, and production starts anew with a clear slate, as is set forth in box 77.

In the event of a fatal fault, the operator is signaled, and the system checks to see if there is a deadlock with box 80. If the system is not deadlocked, then there is a return to box 4, wherein the program E is continued to be recomputed. In the event of a noncatastrophic deadlock, the operator is notified and given the following options: to manually remove items that cannot be completed from the manufacturing system or to have the system itself remove such items. Whenever a catastrophic fault is encountered, the operator is signaled, and the system shuts down.

By arranging a production line in accordance with FIG. 1, scheduling and run-time algorithms, such as those of FIGS. 5 and 6, respectively, result in parallel production processing, which drastically increases the rate at which the production line can operate while minimizing the effect of breakdowns and faults in one or more robots 20 used with the system.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A production line including a plurality of work stations for processing a plurality of workpieces, the production line comprising:

a first turntable means at each work station, the turntable having a central area and a plurality of radial storage sites leading to the central area, wherein workpieces are stored on the radial paths;

means for rotating the first turntable to position the radial paths in selected angular orientations;

second turntable means positioned in alignment with the central area of the first turntable means, the second turntable means having radial transport means associated therewith for shifting workpieces into alignment with selected radial paths on the first turntable means;

means for rotating the second turntable means independently of the first turntable; means for aligning the radial transport with selected radial paths on the first turntable means;

means aligned with each work station for performing a manufacturing operation on workpieces positioned on the second turntable means;

a conveyor lattice comprised of a plurality of conveyors aligned with each work station and extending to adjacent work stations, wherein workpieces may be transferred selectively from one work station to one of a plurality of work stations connected by the conveyors; and means for selecting the work station to which the workpiece is transferred according to the availability of that work station for performing the manufacturing operation on the workpiece.

2. The production line of claim 1, wherein the lattice is configured with at least three conveyor belts aligned with each work station, wherein the means for selecting the work station to which a workpiece is transferred makes selections so that a plurality of workpieces move through the production line in parallel.

3. The production line of claim 2, wherein the workpieces are parts to be assembled at the work stations and wherein the production line includes a plurality of entry and exit points so that the parts enter the lattice at a plurality of work stations and exit the lattice at a plurality of work stations.

4. The production line of claim 3, wherein the means for performing a manufacturing operation is positioned orthogonally of the first and second work stations.

5. The production line of claim 4, wherein the conveyors are belts.

* * * * *